(12) United States Patent
Schiemann

(10) Patent No.: US 7,003,391 B2
(45) Date of Patent: Feb. 21, 2006

(54) METHOD FOR OPERATING AN INTERNAL COMBUSTION ENGINE

(75) Inventor: Juergen Schiemann, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 10/814,515

(22) Filed: Mar. 31, 2004

(65) Prior Publication Data

US 2004/0211392 A1     Oct. 28, 2004

(30) Foreign Application Priority Data

Apr. 1, 2003   (DE)   ............................... 103 14 677

(51) Int. Cl.
*B60T 7/12*   (2006.01)
(52) U.S. Cl. ................. 701/102; 701/103; 123/406.41; 123/435
(58) Field of Classification Search ................. 701/102, 701/103; 123/406.41, 435
See application file for complete search history.

(56) References Cited

U.S. PATENT DOCUMENTS

2004/0025838 A1 *   2/2004   Fuwa et al. ............ 123/406.41

FOREIGN PATENT DOCUMENTS

| EP | 1 138 896 A2 | 10/2001 |
|---|---|---|
| EP | 1 342 899 A1 | 9/2003 |
| WO | 02/48531 A1 | 6/2002 |

OTHER PUBLICATIONS

Jankovic, M., et al: "Torque Management of Engiens with . . . " IEEE Control Systems Magazine, IEEE Inc. New York, US, vol. 18, No. 5, 1998, pp. 34-42.

\* cited by examiner

*Primary Examiner*—Tony M. Argenbright
*Assistant Examiner*—Johnny H. Hoang
(74) *Attorney, Agent, or Firm*—Michael J. Striker

(57) ABSTRACT

In an internal combustion engine (10), exhaust gas leaves a combustion chamber (14) via at least one outlet valve (36) which is opened by an actuator after termination of a working stroke. A pressure value is determined, which characterizes the pressure of the gas in the combustion chamber during the working stroke. An actual value of the valve lift of the outlet valve (36) is determined, together with actual operating parameters of the internal combustion engine (10) which affect this opening stroke, and based on the determined actual valve lift of the outlet valve (36) and actual operating parameters of the internal combustion engine (10), an actual gas pressure in the combustion chamber (14) at the time of the opening of the outlet valve is calculated at least approximately.

9 Claims, 3 Drawing Sheets

METHOD FOR OPERATING AN INTERNAL COMBUSTION ENGINE

BACKGROUND OF THE INVENTION

The present invention relates first to a method of operating an internal combustion engine, in which exhaust gas flows out from at least one combustion chamber after termination of a working stroke via at least one outlet valve driven by an actuator, in which a pressure value is determined, which is indicative of the gas pressure in the combustion chamber during the working stroke.

The invention also relates to a computer program, an electrical storage medium for an electronic control unit of an internal combustion engine, and an electronic control unit used for operating an internal combustion engine.

A method of the above-described type is known from the market. With this method, the gas pressure prevailing during a working stroke in a combustion chamber is directly detected by a sensor, for example, a piezo sensor. Alternatively, it is also known to estimate a mean gas pressure in a combustion chamber during a working stroke and/or during a complete operating cycle based on a measurement and evaluation of the asymmetry of the oscillating rotational speed of a crank shaft. Information about the gas pressure in the combustion chamber during a working cycle can be used to determine the corresponding amount of torque generated by the combustion and/or to estimate the position of the center of heat release during combustion relative to the rotating crank shaft. In addition, the quality of the combustion (for example, incomplete combustion, misfire, and so on) can be evaluated based on the knowledge of the gas pressure in the combustion chamber. All this information can be exploited to achieve an operation of the combustion engine with minimal fuel consumption, minimal noxious exhaust emissions, and an optimal running smoothness.

Therefore, an object of the present invention is to provide a new method of the above-described type, which enhances operation of the internal combustion engine with respect to the above-mentioned quality factors like, for example, running smoothness, while simultaneously preserving or enhancing cost-effectiveness of its manufacturing process.

This object is solved for an internal combustion engine equipped with an outlet valve with variable opening stroke by a method of the above-described type, in which an actual opening stroke or lift of the outlet valve is determined together with actual values of the operating parameters of the internal combustion engine affecting this opening stroke, and in which, based on the determined actual lift of the outlet valve and the determined actual operating parameters of the internal combustion engine, an actual gas pressure in the combustion chamber at the time of the opening of the outlet valve is calculated at least approximately.

SUMMARY OF THE INVENTION

With the use of the method of the present invention, a direct measurement of the gas pressure in the combustion chamber during the working stroke is no longer necessary. Hence, the use of a comparatively expensive pressure sensor can be avoided which saves both the costs of the sensor and related equipment, and of its installation during the manufactoring process of the engine. Accordingly, cost-effectiveness of the manufactoring process of the internal combustion engine is enhanced. Moreover, the value of the actual gas pressure as determined with the aid of the method of the present invention is very accurate, surpassing, in any case, the accuracy of pressure estimates obtained by measuring and evaluating the oscillating rotational speed of the crank shaft.

These benefits of the present invention are attained by exploiting the fact that with the use of an outlet valve which, instead of being controlled by a camshaft, is directly driven by an actuator like, for example, a hydraulic working cylinder, the opening stroke and the gas pressure working against the opening movement of the outlet valve are directly related. Besides gas pressure, the lift of an outlet valve which, for example, is driven by a hydraulic actuator is of course affected by other operating parameters of the internal combustion engine, too. However, when these parameters are known, or are determined, as is proposed in the present invention, the relation between pressure and valve lift is completely known and can be evaluated to determine the gas pressure. Thus, by virtue of the present invention the actual gas pressure in the combustion chamber at the time of the opening of the outlet valve can be determined from the actual opening stroke with enhanced precision.

Based on a good estimate of the actual gas pressure, for example an estimate obtained according to the present invention, a corresponding cylinder-individual torque contribution generated by the combustion process in a working cycle can be determined with high accuracy which simplifies the task of accurately controlling the operation of the internal combustion engine. Above all, fuel consumption, exhaust emissions, and running smoothness of the internal combustion engine all are improved by exploiting the possibilities of enhanced engine control functions based on the present invention.

In a particularly preferred embodiment of the present invention a first method of computation is provided which allows to calculate, or predict, the gas pressure in a future working stroke on the basis of estimated values of the operating parameters of the internal combustion engine for this future working stroke. Upon completion of the future working stroke, this predicted value of the gas pressure in the combustion chamber is then compared with the actual gas pressure as determined from the actual lift of the outlet valve according to the method of the present invention. Depending on the result of this comparison, the first method of computation of the gas pressure in the working stroke is accordingly improved by means of an adaptation procedure, correcting for example the values of a set of calibration or adaptation parameters used in this method, in order to enhance the accuracy of the predicted values. It is important to observe that this first method of computation or, more precisely, the estimate of the gas pressure in a future working stroke as calculated by this first method is needed in order to determine the corresponding control parameters for the electronic control of the outlet valve which, in the scope of the present invention, is actuated directly, for example, by a hydraulic actuator. Hence, when the present invention as described above is exploited in order to continuously improve or adapt a first method of computation used to predict the gas pressure in a future working stroke, this will in turn improve the precision of the control of the outlet valve itself.

Likewise, the above-mentioned possibility to compare a predicted pressure value, derived by a first method of computation, with an actual value of the gas pressure determined according to the method of the present invention, can be further exploited to generate additional information and/or to initiate further suitable measures. For example, differences between the estimated gas pressure and the actual gas pressure which exceed a predetermined level can trigger a respective entry in a fault code memory of the electronic control unit and/or an optical or acoustical notification to the driver of a vehicle equipped with the internal combustion engine. In this manner, exceptional conditions or faults occuring during the operation of the combustion engine like, for example, combustion misfire, can be recognized and/or signaled to the user.

A first and general algorithm for the computation of the actual gas pressure which is easily implemented as a computer program in a respective electronic control unit is represented by the following formula:

$$paoact = -\frac{C1}{2*C2} + \sqrt{\left(\frac{C1}{2*C2}\right)^2 + \frac{hact - C0}{C2}}$$

wherein C0, C1, and C2 are coefficients, which at least in part depend on the operating parameters of the internal combustion engine affecting the valve lift of the outlet valve, and wherein hact is the determined valve lift. Technically, the square root function can be represented, for example, in a tabular form, that is, as a characteristic line, or using functional approximations like, for example, polynomials or rational functions.

As a very suitable simplification it is proposed to represent the above-described general computational formula approximately by a polynomial of second order, based on the fact that in typical applications the relation between pressure paoact and valve lift hact can be approximated quadratically with a very high degree of accuracy. Thus, the simplified formula for determining the actual gas pressure runs as follows:

$$paoact = C1*(hact-C0) + C2*(hact-C0)^2$$

This formula has the advantage that it is represented by a particularly simple computational algorithm and that the execution of a corresponding piece of code is very fast. For the sake of simplicity, the new coefficients included in this second formula are represented here likewise as C0, C1, and C2 as in the first formula above. It is possible and may be advantageous to represent or calculate the new coefficients as a function of the coefficients of the first equation. These transformations can be represented by simple and computationally efficient algorithms. Using these relations is particularly advantageous if the first named coefficients are already known and/or can be calculated in a simple manner. In a further embodiment, it is proposed that at least one of the coefficients C0, C1, and C2 is determined by means of a polynomial expression with linear and quadratic terms, depending on the operating parameters of the internal combustion engine with affect the lift of the outlet valve. This solution can likewise be represented by a very simple computer program which requires only minimal computational and memory resources. Furthermore, it may be possible to represent the coefficient C2 simply by a constant with a negative value.

Alternatively or in addition, it is also possible to compute at least one of the coefficients C0, C1, and C2 by means of at least one characteristic map, depending on certain operating parameters of the internal combustion engine. In this manner the coefficients C0, C1, and C2 can be determined with very high precision for the whole range of operating conditions of the internal combustion engine.

Particularly good results of the method of the present invention are achieved when the operating parameters include an actuation time of a control device of the outlet valve which is applied for the desired valve stroke, a rotational speed of a crank shaft, an angular position of the crank shaft at the time of the opening of the outlet valve, a mean pressure of the exhaust gas downstream of the outlet valve at the time of the opening of the outlet valve, a temperature of a hydraulic fluid with which the outlet valve is actuated, and a pressure of the hydraulic fluid. Generally, the result of the method of the present invention which determines a gas pressure in the combustion chamber from the opening stroke of the outlet valve is the more precise the more of the operating parameters of the internal combustion engine are taken into account which affect the actual valve lift of the outlet valve.

With very high demands on the accuracy of the method, it can be advantageous to include the mass of the working gas enclosed in the combustion chamber as a further operating parameter in the calculation of the gas pressure according to the present invention. In this manner, also the effect of the gas temperature is taken into consideration. The use of the gas mass instead of the gas temperature represents a particularly preferable solution, since in typical situations the gas mass is already determined in connection with the control of the internal combustion engine or can otherwise be calculated easily from other known parameters.

It is furthermore proposed that the opening stroke or lift of the outlet valve is determined by means of a linear displacement sensor or position sensor. This sensor can be relatively simply installed at or integrated in the actuator of the outlet valve. As there is no need to place this sensor directly in the combustion chamber or on the level of its surface, thermal stress is not a problem, which allows the use of a comparatively cost-effective sensor equipment for this purpose. If a displacement or position sensor is used, the opening stroke of the outlet valve can be detected with high accuracy, which, in turn, improves the accuracy of the calculation of the actual gas pressure according to the present invention.

It is also possible, however, to determine the lift of the outlet valve from other kinds of feedback signals which represent an indirect measure of the valve lift. For example, the valve lift can be determined from the time required for the corresponding closing process of the valve. This time duration, in turn, can be determined based on the respective control signal or event which initiates the closing the valve actuator, and on the determination of the end of the closing process, which, for example, can be detected from the structure-borne noise caused by the impact of the outlet valve on the valve seat. Even with multi-cylinder internal combustion engines this characteristic noise signal can often be detected by means of a single sensor, for example, a knock sensor which is already provided for other reasons, that is, for knock control. Hence this embodiment of the method of the present invention is particularly suitable to minimize system costs.

With a computer program which is programmed for performing the method of the present invention, the above-described object is solved. With an electrical storage medium, the object is solved, in that on this storage medium, a computer program of the above type is stored. With an electronical control unit for an internal combustion engine, the object is solved, in that it is programmed for use in a method of the above type.

DETAILED DESCRIPTION OF THE PREFERRED EMBODIMENTS

Figure 1:
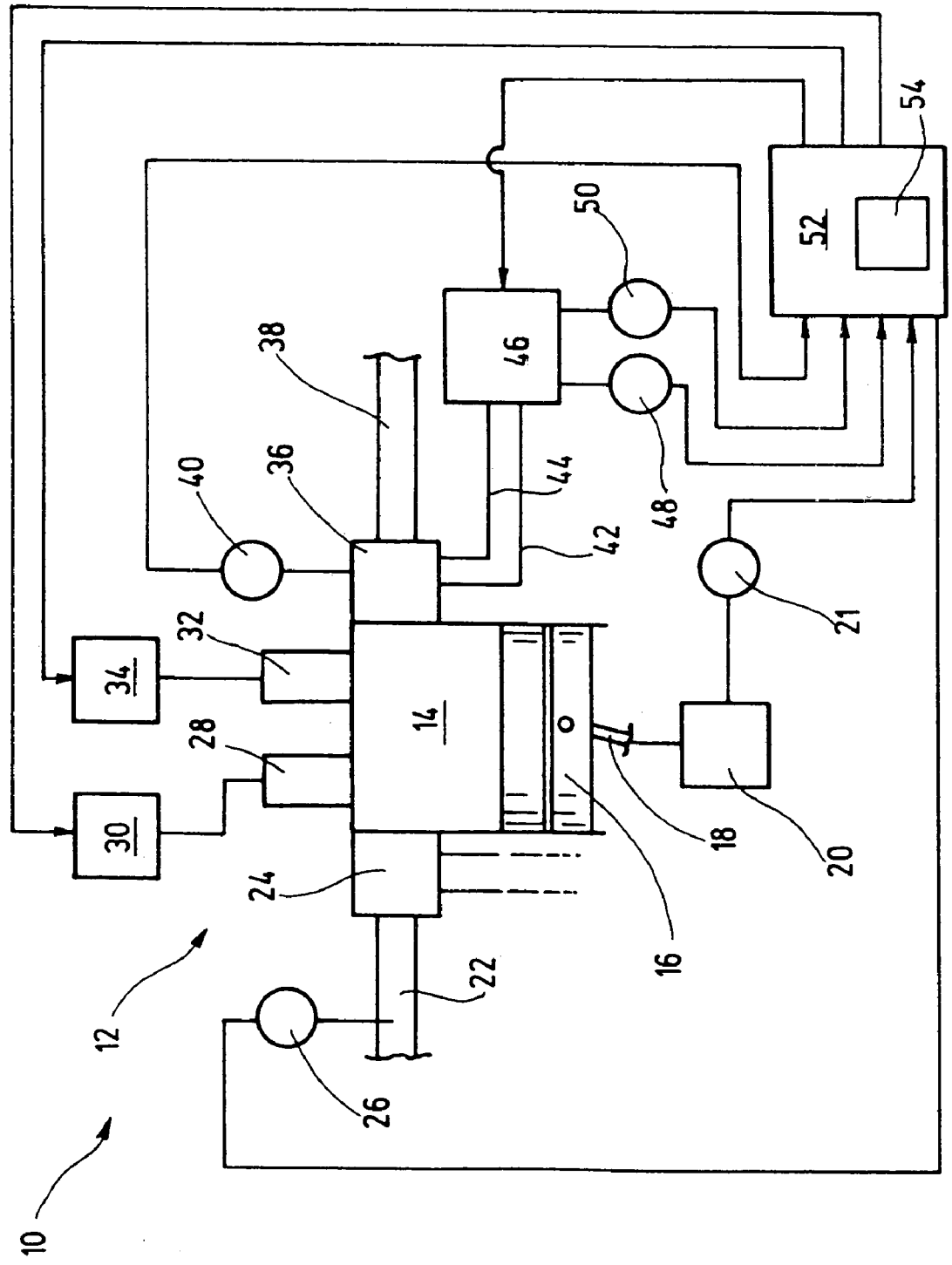
FIG. 1 is a schematic illustration of an internal combustion engine with a combustion chamber and a hydraulically actuated outlet valve.

In FIG. 1, an internal combustion engine is designated generally with reference numeral 10. It serves to drive a motor vehicle, which is not shown in FIG. 1. The internal combustion engine 10 is conceived as an engine with multiple cylinders, of which only one is shown in FIG. 1 and which is designated with reference numeral 12.

A combustion chamber 14 is associated with the cylinder 12, which is delimited on one side by a back and forth-moving piston 16. Via a piston rod 18, the piston works on a crank shaft 20, shown only symbolically, whose angular position is detected by a sensor 21. Combustion air is admitted into the combustion chamber 14 via an inlet channel 22 and a hydraulically actuated inlet valve 24. The amount of fresh air flowing through the inlet channel 22 into the combustion chamber 14 is detected by a sensor 26. This operates as a hot-film air mass flow sensor, which is also designated as a "HFM-sensor".

Fuel is metered into the combustion chamber 14 directly via an injector 28. The fuel is supplied by a fuel system 30. A fuel-air mixture provided in the combustion chamber 14 is ignited by a spark plug. The ignition energy is supplied by an ignition system 34. Burned combustion gas or exhaust gas which is produced by the combustion process in the combustion chamber 14 is conducted via a hydraulically actuated outlet valve 36 into an exhaust tube 38. The opening stroke or lift of a valve element of the outlet valve 36 (not visible in FIG. 1) is detected by a valve lift sensor 40. It is observed that the internal combustion engine 10 in this exemplary embodiment does not apply a camshaft for the control of the valves 24 and 36.

The hydraulic actuation of the outlet valve 36 is achieved by means of hydraulic lines 42 and 44, which connect the outlet valve 36 or a hydraulic actuation device (not shown) associated with it to a hydraulic control device 46. Essential elements of this hydraulic control device are fast-switching hydraulic valves (not shown), which control the opening- and closing processes of the outlet valve 36. Sensors 48 and 50 are used to determine the temperature and the pressure of the hydraulic fluid, with which the outlet valve 36 is controlled. The inlet valve 24 is actuated analogously.

It should be noted that, in an actual embodiment of the system, individual elements or partial systems can be combined differently than in the schematic arrangement shown in FIG. 1. For example, the units 36 and 46 shown in the figure can be combined completely or partially into a structurally integrated component.

The operation of the internal combustion engine 10 is controlled or regulated by an electronic control unit 52. This unit acquires input signals from the HFM sensor 26, from a position sensor 21 of the crank shaft 20, from the valve lift sensor 40, and from the temperature sensor 48 and the pressure sensor 50. The latter sensors measure temperature and pressure of the pressurized fluid which is used in the hydraulic control device 46. The electronic control unit 52 controls the fuel system 30, the ignition system 34, and the hydraulic control device 46 of the outlet valve 36.

In addition, the electronic control unit 52 also calculates further operating parameters on the basis of the input signals, such as, for example, a rotational speed of the crank shaft 20, an exhaust gas pressure pabg in the exhaust tube 38, and others.

With the internal combustion engine 10 shown in FIG. 1, the opening stroke or lift of the inlet valve 24 can be adapted to the respective operating point of the internal combustion engine 10 individually and in the same way as is done for the outlet valve 36. For this purpose, a desired valve lift or target value hsol of a respective valve is determined on the basis of the actual operating point of the internal combustion engine 10 and converted into an actuation time tm of an electromagnetic switch valve within the hydraulic control device 46.

For this conversion, essential influencing variables and/or forces which affect the opening process of the valve and, hence, the resulting valve lift are taken into consideration appropriately. These influencing variables include operating parameters of the internal combustion engine 10 relating to the hydraulic control device 46, for example, a temperature Toil of the hydraulic fluid, which is detected by the temperature sensor 48, a pressure Poil of the same hydraulic fluid, which is detected by the pressure sensor 50, a rotational speed nmot of the crank shaft 20, which is detected by the position sensor 21, as well as the gas forces acting on the outlet valve 36 during its opening process due to the gas pressure in the combustion chamber 14. These forces can, for example, be accounted for by determining an initial force value at the time of the opening of the outlet valve 36, this initial value, in turn, being computed from the rotational speed nmot of the crank shaft 20, the crank shaft position wao at the time of the opening of the outlet valve 36, the back pressure pabg of the exhaust gas downstream the outlet valve at the time of the valve opening, and the pressure pao of the working gas in the combustion chamber 14 at the time of the valve opening.

It is evident that a respective value of the actuation time tm which is applied for the control of the opening process of the outlet valve 36 must be determined by the electronic control unit 52 prior to the corresponding actuation of the valve, hence, at a time when the actual value of the gas pressure in the combustion chamber 14 at the beginning the opening process of the valve can not yet be determined exactly or, in particular, can not yet be determined by measurement. Hence, a corresponding predicted value paopred of this gas pressure is calculated or estimated in advance. This estimation is performed on the basis of the respective values of the operating parameters of the combustion engine 10 which are demanded and controlled for the related future working stroke. These values comprise, for example, the masses of the air charge and of the residual gas in the combustion chamber, a fuel mass, and if necessary, an ignition angle and further parameters. The air mass is determined or estimated, for example, based on measured values recorded by means of the HFM sensor 26. In this manner, a calculation of the actuation time tm as required for the control of an opening process of the outlet valve 36 is performed, based on a correlation as given in the following equation 1:

$$tm = func\_tm(h, Toil, Poil, nmot, wao, pabg, pao) \quad (1)$$

with h=hsol and pao=paopred.

For an optimal control and/or regulation of the operation of the internal combustion engine 10, knowledge of the real, that is, the actual gas pressure in the combustion chamber 14 at the end of a working stroke is very important and useful. In order to determine the actual gas pressure in the combustion chamber 14 at the end of a working stroke of a respective cylinder 12, or precisely, at the time of opening of the outlet valve 36 of the cylinder, the relation between the actuation time tm and the valve lift h as described in equation 1 is reversed to obtain a correlation as shown in equation 2:

$$h = func\_hub(tm, Toil, Poil, nmot, wao, pabg, pao) \quad (2)$$

The function func_hub describes in a general way the dependency of the resulting valve lift h on the actuation time tm and the operating parameters Toil, Poil, nmot, wao and so on. This correlation can be determined empirically, for example, by corresponding experiments on a running engine with a suitable variation of the operating conditions. A closer look at the dependency of the valve lift h on the gas pressure pao reveals that one can approximate this correlation with a very high accuracy by means of a polynomial of the second order.

Figure 2:
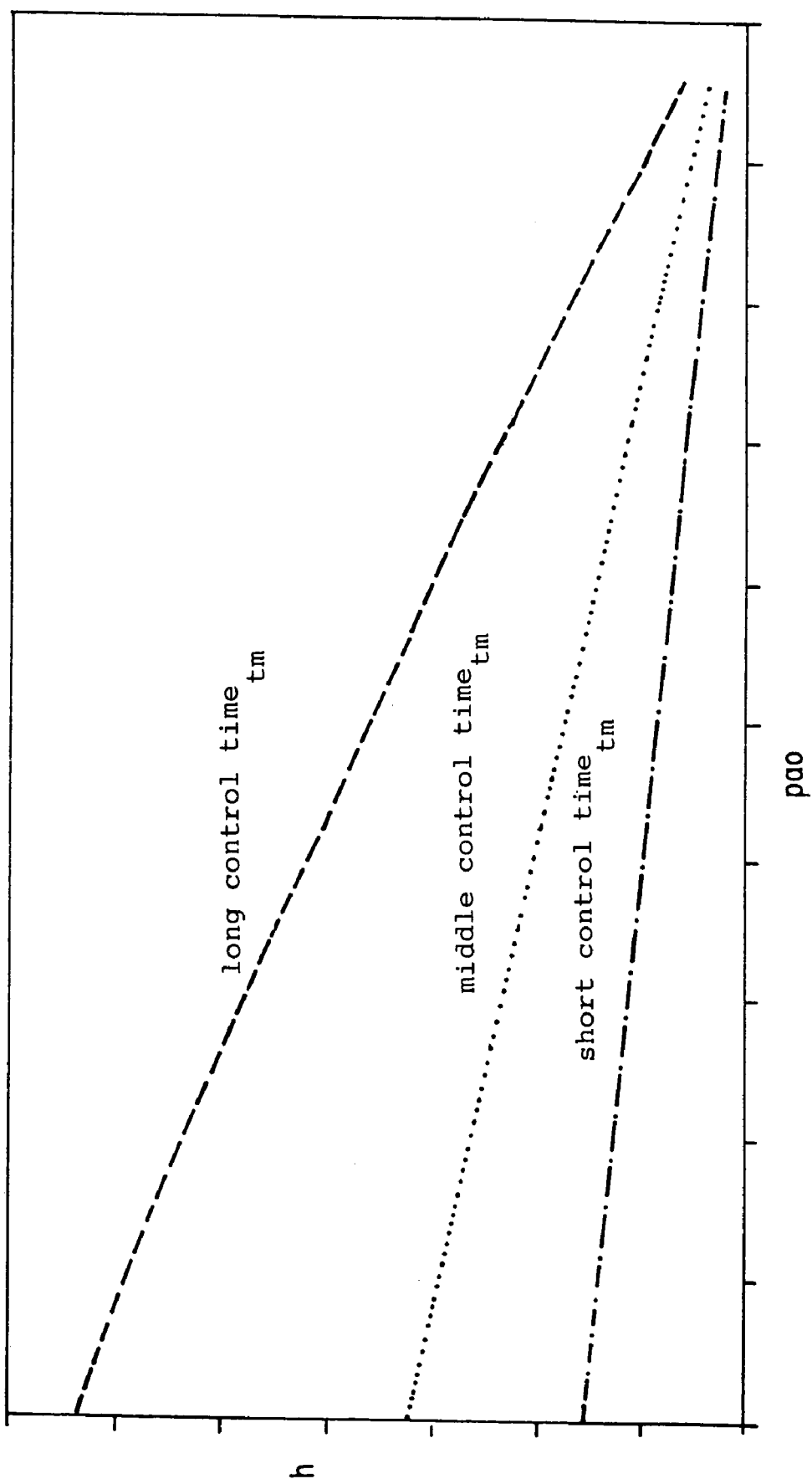
FIG. 2 is a graph showing the variation of the stroke of the outlet valve of FIG. 1 with the gas pressure in the combustion chamber of FIG. 1 for three different values of the actuation time of the valve actuator of the outlet valve.

This can be recognized well from the graphic illustration shown by way of example in FIG. 2. There, the variation of the valve lift h as a function of the gas pressure pao is plotted for three constant values of the actuation time tm and with fixed values of the angle wao and of the operating parameters Poil, Toil, nmot and pabg. The curves are approximately linear with a negative gradient and a slight curving, which can be described by means of a quadratic term in pao with a small negative coefficient. The quadratic approximation leads to equation 3:

$$h = C1*pao + C2*pao^2 \quad (3)$$

wherein $$C0 = func\_C0(tm, Toil, poil, nmot, wao, pabg) \quad (4)$$

$$C1 = func\_C1(tm, Toil, poil, nmot, wao, pabg) \quad (5)$$

$$C2 = func\_C2(tm, Toil, poil, nmot, wao, pabg) \quad (6)$$

In special case, the coefficient C2 depends only weakly on the actual operating parameters of the internal combustion engine. It can then be treated in a good approximation as a constant, which has a negative value. Generally, the functions in equations 4 to 6 can be represented in a sufficiently good approximation by polynomials with linear and quadratic terms. In order to simplify these polynomials, it can be advantageous to describe the dependency on the angle wao of the crank shaft 20 at which the outlet valve 36 opens, by way of substitution, as a dependency on a combustion chamber volume Vbr which itself depends on the angular position wao. Also, a variable representing the (relative) rate of change of the combustion chamber volume Vbr with respect to the angular position, or crank angle, of the crank shaft 20 proves very suitable for a simplification of the above-mentioned polynomials. This functional dependency can be represented and calculated in a simple manner, for example, by way of a characteristic line or a polynomial approximation depending on the angle wao.

When the polynomial of the second order (equation 3 above) is related to a determined actual lift hact of the outlet valve 36 and a corresponding actual gas pressure paoact, this results in the following equation 7:

$$hact = C0 + C1*paoact + C2*paoact^2 \quad (7)$$

Solving this polynomial of the second order with respect to the actual gas pressure paoact leads to the following equation 8:

$$paoact = -\frac{C1}{2*C2} + \sqrt{\left(\frac{C1}{2*C2}\right)^2 + \frac{hact - C0}{C2}} \quad (8)$$

Equation 8 can be used to calculate the actual gas pressure paoact at the end of a working stroke of the cylinder 12, provided that the actual lift hact of the outlet valve 36 and the actual values of a set of operating parameters of the internal combustion engine 10 are known or are determined, and the coefficients C0, C1, and C2 are determined based on these operating parameters. A corresponding method is explained in greater detail with reference to FIG. 3. The method is stored as a computer program on a storage medium 54 of the electronic control unit 52.

After a starting block 56, the actual valve lift hact of the outlet valve 36 in the actual working cycle is determined in a block 58. In this calculation, measured values which are computed from the signal of the valve lift sensor 40 are used. In functional blocks 60, 61, and 62, coefficients C0, C1, and C2 are determined. As explained above, this calculation can employ representations of the functions func_C0, func_C1, and func_C2, for example, based on polynomial expressions or characteristic maps, whose coefficients or values are determined by experiment. The functional blocks 60 through 62 therefore use data or information provided for the actual working cycle by a block 63, wherein these data are determined from the signals of the position sensor 21 of the crank shaft 20, the HFM sensor 26, the valve lift sensor 40, the temperature sensor 48, the pressure sensor 50, and possibly of additional sensors.

Accordingly, the coefficients C0, C1, and C2 are provided in the blocks 64 through 68. The determined actual valve lift hact, as well as the computed values of the coefficients C0, C1, and C2 are delivered to a functional block 70, in which the actual gas pressure paoact in the combustion chamber 14 at the time of the opening of the outlet valve 36 is determined according to the above-described equation 8. For calculating the square root function, for example, a tabular representation of this function as a characteristic line or a (piecewise) representation as a polynomial or rational function can be used.

Figure 3:
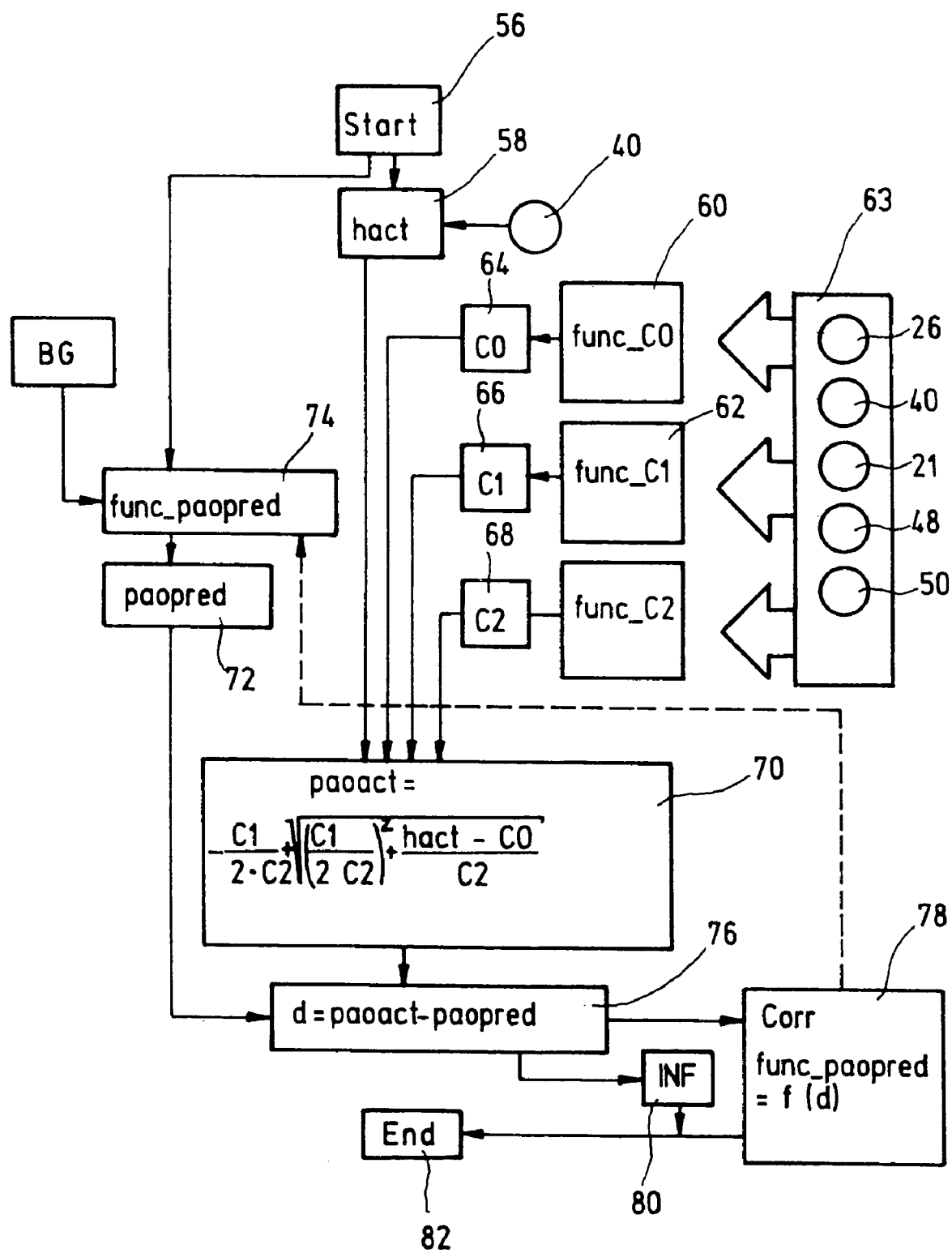
FIG. 3 is a flow chart, which represents a method of operating the internal combustion engine of FIG. 1.

Before the actual working cycle, a predicted value paopred (block 72) for the gas pressure in the combustion chamber at the time of the opening of the outlet valve 36 in the actual working cycle is determined by means of a functional block 74, based on a set of operating parameters BG of the internal combustion engine which are controlled and/or estimated for the actual working cycle by the electronic control unit 52. The operating parameters include, for example, an ignition angle, an injected fuel mass, a time or crank angle where the outlet valve is required to start opening, a combustion air mass, and so on. In block 75, a difference d between the predicted gas pressure paopred and the determined actual gas pressure paoact is formed. In block 78, depending on the difference d, the function func_ paopred which is used to predict the gas pressure paopred in block 74, or more specifically and by way of example, a set of application or adaptation data employed in the computation of this function, is corrected or adapted in order to improve the prediction. This adaptation compensates for effects of a possible drift of engine parameters, typically caused by a wear of components, thereby guaranteeing that the absolute values of the deviation d will stay sufficiently small and, hence, the prediction paop red sufficiently precise in the course of time. In addition, depending on the difference d a piece of information INF is generated in block 80. More specifically, this may encompass, for example, the generation of an entry in a fault code memory or the issuing of a warning signal, when the difference d exceeds a predetermined threshold. The exemplary representation of the method of the invention (as shown in FIG. 3) terminates in block 82.

In an alternative embodiment, the calculation of paoact is performed using a quadratic approximation of the correlation of paoact and hact instead of equation (8). Hence the following equation (9) is employed in this case:

$$paoact = C1*(hact-C0) + C2*(hact-C0)^2 \qquad (9)$$

Herein, the new coefficients are equally named C0, C1, . . . for the sake of simplicity. They should not be mixed up, however, with the first set of coefficients C0, C1, . . . given above.

This alternative embodiment of the invention can be represented essentially in the same way as shown in FIG. 3, with the difference that, in the functional block 70, paoact is determined according to equation (9) instead of equation (8).

In a further alternative embodiment, the actual valve lift hact of the outlet valve 36 is not detected by means of a valve lift sensor, but computed from the time required for the closing process of the outlet valve 36. The beginning of the closing process is, for example, deduced directly from a corresponding actuation signal which triggers a hydraulic switching valve of the hydraulic control device 46 thereby initiating the closing of the valve actuator. The end of the closing process can in turn be detected, for example, by the noise that is released upon the impact of the valve element of the outlet valve 36 on a corresponding valve seat.

Further information which is required for this indirect method of computing the actual valve lift, like, for example, a delay time of the above-mentioned switching valve and a closing speed of the outlet valve can be determined empirically by means of measurements. The corresponding values can be stored, for example, in a tabular representation, that is, as a characteristic map depending on the operating parameters Poil and Toil, within a storage medium 54 of the electronic control unit 52.

It should be further noted that the knowledge of the actual value paoact of a gas pressure, which is determined according to the present invention, and which is here used, for example, to adapt a computational method serving to determine a predicted value paopred of this same gas pressure which is used in the control of the valve lift, can also be used for additional purposes. In particular, the control of other engine variables like, for example, the ignition angle, which exert an influence on the actual gas pressure paoact can be adapted or improved analoguously to the procedure described above. Hence, the present invention can be used to achieve an optimal control of the internal combustion engine with respect to its performance as requested by the driver, its fuel consumption, exhaust quality, and/or running smoothness.

In the above-described embodiments, the inlet and outlet valves of an internal combustion engine are moved by means of electro-hydraulic valve actuators, which work with hydraulic auxiliary energy (pressure force). In this case the force flux is controlled electrically by means of fast switching hydraulic valves. In alternative embodiments of the invention, however, the engine valve actuator can operate according to a different principle, provided that this operating principle equally allows for an adjustment and control of a variable lift of the corresponding outlet valves. For example, instead of hydraulic energy, electric or pneumatic auxiliary energy can be used as well. Furthermore a completely variable engine valve actuation is only required for the outlet valves, whereas the inlet valves may, for example, be moved conventionally by means of a camshaft. In additional alternative embodiments the present invention can also be applied to a compression-ignited internal combustion engine and/or to an engine equipped with external mixture preparation, that is, with fuel injectors placed in the inlet channels.

It will be understood that each of the elements or features which are contained in the figures or are described in the text above or in the following claims, or any combination of these, may also find useful applications in other types of constructions differing from the types described above.

While the invention has been illustrated and described herein as a method of operating an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for operating an internal combustion engine (10), wherein:
   at least one outlet valve (36) is opened with the aid of an actuator upon termination of a working stroke, thereby releasing exhaust gas from at least one combustion chamber (14);
   a pressure value is determined which is indicative of the gas pressure in the combustion chamber (14) during the working stroke;
   characterized in that:
   an actual value (hact) of the lift of the outlet valve (36) is determined together with actual operating parameters (tm, Toil, Poil, nmot, wao, pabg) of the internal combustion engine that affect the valve lift (hact); and
   an actual gas pressure (paoact) of the gas pressure in the combustion chamber (14) at the time of an opening of the outlet valve (36) is determined at least approximately based on the determined actual valve lift (hact) of the outlet valve (36) and the determined actual operating parameters (tm, Toil, Poil, nmot, wao, pabg) of the internal combustion engine (10), wherein on the basis of a set of operating parameters (BG) of the internal combustion engine (10) which are effective for a future working stroke, an estimated gas pressure (paopred) in the combustion chamber (14) is determined for the future working stroke, wherein termination of this working stroke, the estimated gas pressure (paopred) determined for this working stroke is compared with the actual gas pressure (paoact) determined for this working stroke, and wherein, depending on a result of the comparison, a method (func paopred) is adapted by which the estimated gas pressure (paopred) is determined.

2. A method for operating an internal combustion engine (10), wherein:
   at least one outlet valve (36) is opened with the aid of an actuator upon termination of a working stroke, thereby releasing exhaust gas from at least one combustion chamber (14);
   a pressure value is determined which is indicative of the gas pressure in the combustion chamber (14) during the working stroke;
   characterized in that:
   an actual value (hact) of the lift of the outlet valve (36) is determined together with actual operating parameters (tm, Toil, Poil, nmot, wao, pabg) of the internal combustion engine that affect the valve lift (hact); and
   an actual gas pressure (paoact) of the gas pressure in the combustion chamber (14) at the time of an opening of the outlet valve (36) is determined at least approximately based on the determined actual valve lift (hact) of the outlet valve (36) and the determined actual operating parameters (tm, Toil, Poil, nmot, wao, pabg) of the internal combustion engine (10), wherein on the basis of a set of operating parameters (BG) of the internal combustion engine (10) for a future working stroke, an estimated gas pressure (paopred) in the combustion chamber (14) is determined, wherein, after termination of this working stroke, the estimated gas pressure (paopred) determined for this working stroke is compared with the actual gas pressure (paoact) determined for this working stroke, and wherein, depending on a result of the comparison, a piece of information (INF) is issued.

3. A method for operating an internal combustion engine (10), wherein:
   at least one outlet valve (36) is opened with the aid of an actuator upon termination of a working stroke, thereby releasing exhaust gas from at least one combustion chamber (14);
   a pressure value is determined which is indicative of the gas pressure in the combustion chamber (14) during the working stroke;
   characterized in that:
   an actual value (hact) of the lift of the outlet valve (36) is determined together with actual operating parameters (tm, Toil, Poil, nmot, wao, pabg) of the internal combustion engine that affect the valve lift (hact); and
   an actual gas pressure (paoact) of the gas pressure in the combustion chamber (14) at the time of an opening of the outlet valve (36) is determined at least approximately based on the determined actual valve lift (hact) of the outlet valve (36) and the determined actual operating parameters (tm, Toil, Poil, nmot, wao, pabg) of the internal combustion engine (10), wherein the actual gas pressure (paoact) is determined by the following formula:

$$paoact = -\frac{C1}{2*C2} + \sqrt[2]{\left(\frac{C1}{2*C2}\right)^2 + \frac{hact - C0}{C2}}$$

wherein C0, C1, and C2 are coefficients, which depend at least in part on the operating parameters (tm, Toil, Poil, nmot, wao, pabg) of the internal combustion engine (10) affecting the valve lift (hact) of the outlet valve (36), and wherein had is the determined actual value of the valve lift.

4. The method according to claim 3, wherein at least one of the coefficients C0, C1, and C2 is determined by a polynomial (func_C0, func_C1, func_C2) with linear and quadratic terms which depend on operating parameters (tm, Toil, Poil, nmot, wao, pabg) of the internal combustion engine (10) affecting the valve lift (hact).

5. The method according to claim 3, wherein at least one of the coefficients C0, C1, and C2 is determined by a characteristic map, which depends on operating parameters of the internal combustion engine (10) affecting the valve lift (hact).

6. A method for operating an internal combustion engine (10), wherein:
   at least one outlet valve (36) is opened with the aid of an actuator upon termination of a working stroke, thereby releasing exhaust gas from at least one combustion chamber (14);
   a pressure value is determined which is indicative of the gas pressure in the combustion chamber (14) during the working stroke;
   characterized in that:
   an actual value (hact) of the lift of the outlet valve (36) is determined together with actual operating parameters (tm, Toil, Poil, nmot, wao, pabg) of the internal combustion engine that affect the valve lift (hact); and
   an actual gas pressure (paoact) of the gas pressure in the combustion chamber (14) at the time of an opening of the outlet valve (36) is determined at least approximately based on the determined actual valve lift (hact) of the outlet valve (36) and the determined actual operating parameters (tm, Toil, Poil, nmot, wao, pabg) of the internal combustion engine (10), wherein the actual gas pressure (paoact) is determined by the following formula:

$paoact=(C1*hact-C0)+C2*(hact-C0)^2$ wherein C0, C1, and C2 are coefficients that depend at least in part on the operating parameters (tm, Toil, Poil, nmot, wao, pabg) of the internal combustion engine (10) affecting the valve lift (hact) of the outlet valve (36), and wherein had is the determined actual value of the valve lift.

7. The method according to claim 6, wherein at least one of the coefficients C0, C1, and C2 is determined by a polynomial (func_C0, func_C1, func_C2) with linear and quadratic terms which depend on operating parameters (tm, Toil, Poil, nmot, wao, pabg) of the internal combustion engine (10) affecting the valve lift (hact).

8. The method according to claim 6, wherein at least one of the coefficients C0, C1, and C2 is determined by a characteristic map, which depends on operating parameters of the internal combustion engine (10) affecting the valve lift (hact).

9. A method for operating an internal combustion engine (10), wherein:
   at least one outlet valve (36) is opened with the aid of an actuator upon termination of a working stroke, thereby releasing exhaust gas from at least one combustion chamber (14);
   a pressure value is determined which is indicative of the gas pressure in the combustion chamber (14) during the working stroke;
   characterized in that:
   an actual value (hact) of the lift of the outlet valve (36) is determined together with actual operating parameters (tm, Toil, Poil, nmot, wao, pabg) of the internal combustion engine that affect the valve lift (hact); and an actual gas pressure (paoact) of the gas pressure in the combustion chamber (14) at the time of an opening of the outlet valve (36) is determined at least approximately based on the determined actual valve lift (hact) of the outlet valve (36) and the determined actual operating parameters (tm, Toil, Poil, nmot, wao, pabg) of the internal combustion engine (10), wherein the operating parameters used in the computation of an actual value (paoact) of the gas pressure in the combustion chamber (14) at the time of an opening of the outlet valve (36) include an actuation time (tm) of a control device (46) of the outlet valve which is applied for the desired valve lift, a rotational speed (nmot) of a crank shaft (20), an angular position (wao) of the crank shaft (20) at the time of the opening of the outlet valve (36), a mean pressure (pabg) of the exhaust gas downstream of the outlet valve (36) at the time of the opening of the outlet valve (36), a temperature (Toil) of a hydraulic fluid with which the outlet valve (36) is actuated, a pressure (Poil) of the hydraulic fluid, and/or a mass of a working gas enclosed in the combustion chamber.

* * * * *